(No Model.)

S. P. SNYDER.
DUMPING WAGON.

No. 522,697. Patented July 10, 1894.

Witnesses
G. E. Purple
L. P. Lyon

Inventor
Simon P. Snyder
By Paul _____ Att'ys

UNITED STATES PATENT OFFICE.

SIMON P. SNYDER, OF MINNEAPOLIS, MINNESOTA, ASSIGNOR OF ONE-FOURTH TO FRED. B. SNYDER, OF SAME PLACE.

DUMPING-WAGON.

SPECIFICATION forming part of Letters Patent No. 522,697, dated July 10, 1894.

Application filed January 31, 1893. Serial No. 460,253. (No model.)

*To all whom it may concern:*

Be it known that I, SIMON P. SNYDER, of Minneapolis, in the county of Hennepin and State of Minnesota, have invented a certain new and Improved Dumping-Wagon, of which the following is a specification.

My invention relates to dumping wagons and the object which I have in view is to greatly simplify and cheapen the construction of such wagons and to render it easy for a single man to move and tilt the box of the wagon, and also to so arrange the box that, while being slidable upon the wagon-frame it will not be detached therefrom and if necessary may be tilted and then dragged to scatter the load. This is particularly advantageous in farm-wagons or for wagons used for carrying coal and wood.

The invention consists, in general, in the constructions and combinations hereinafter described and particularly pointed out in the claims, and will be more readily understood by reference to the accompanying drawings, forming a part of this specification, in which—

Figure 1:
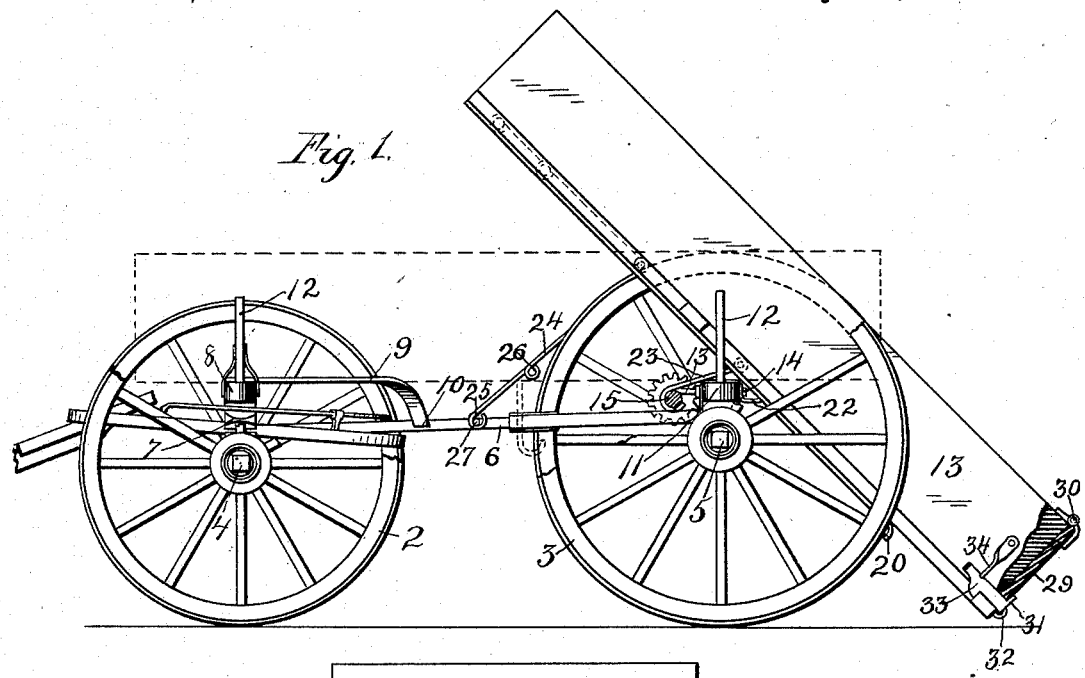
Figure 2:
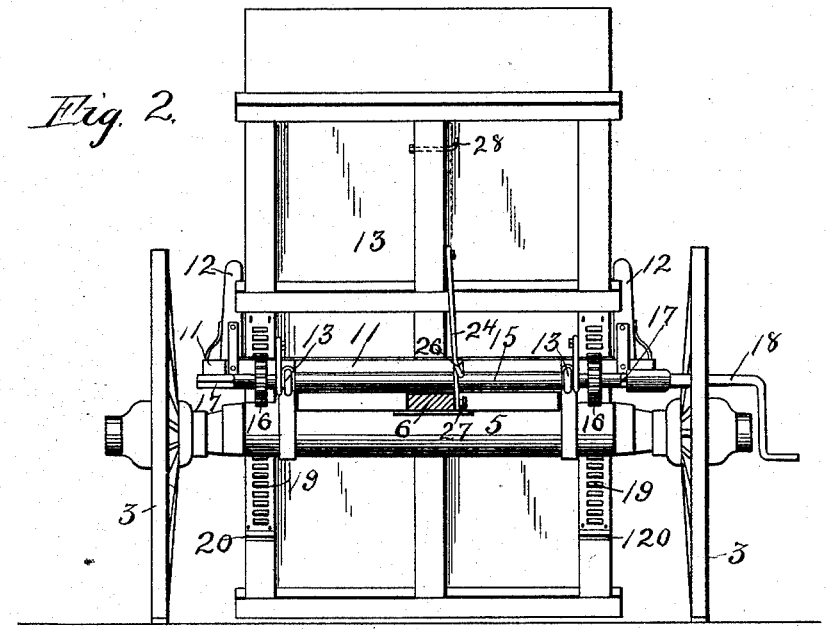
Figure 3:
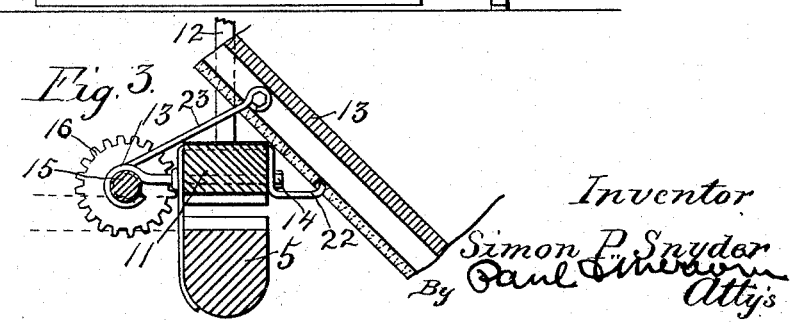

Figure 1 is a side elevation of a wagon embodying my invention and shows the box tilted. Fig. 2 is a front view of the same. Fig. 3 is an enlarged detail showing the rear-axle of the wagon and the rack upon the bottom of the wagon-body or box.

In the drawings I have shown my invention as applied to a four wheeled wagon but it is equally applicable to two wheeled carts where the tongue is secured to a small pair of carrying wheels.

As shown in the drawings, 2 represents the fore wheels and 3 the rear wheels of the wagon, having axles 4 and 5 respectively, and connected by a reach, this reach being secured in the bolster 7 upon the fore-axle. Above this bolster I provide a second bolster or block 8 which is made rigid with respect to the reach and the rear axle by means of the yoke-bar 9 passing from its ends backward and downward and secured by a suitable loop to the reach at 10. The rear bolster 11 is secured permanently to the rear axle and standards 12 are pivoted upon both the bolster 11 and the bolster 8, between which the wagon box 13 is held. Projecting forward from the bolster 11 are two large heavy eye-bolts 13 having their shanks extending through the bolster and fastened by the nuts 14. In these eye-bolts is journaled a shaft, 15, which is additionally supported by the reach and the stays thereof, and bears two gear-wheels 16 and having the rectangular ends 17 upon which a suitable crank 18 may be slipped to turn the shaft and the gear-wheels. The sills of the box are made smooth to slip freely over the bolsters and on each sill and extending about half the length thereof is a rack-bar 19. The rear ends 20 of these rack-bars are bent downwardly and form stops to prevent the advance of the wagon-body beyond the proper position, when it is replaced upon the truck. The gear-wheels 16 mesh with these racks and it will be seen that by turning the crank 18 the box may be moved back on the bolster until it reaches a position where its own weight will tilt it. At this time the box is prevented, by the hooks 22, from slipping entirely off the bolster. These hooks are preferably secured upon the rear ends of the eyebolts 13. In addition I provide the hooked links or long hooks 23 pivoted upon the bottom of the wagon-body and adapted to automatically fall into place upon the shaft 15, as clearly shown. When the box is in its normal position these hooks hang downward, as shown in dotted lines in Fig. 1. If it is desired that the end of the box shall not touch the ground when the box is tilted the double link 24 may be used to hold down the upper ends of the box. This link is pivoted to the middle sill of the box and has two curls or eyes 25, 26, either of which may be slipped over the pin 27 on the reach. When not in use this long link is turned up underneath the box and secured in position by the hooked-bolt-pin 28.

In connection with the sliding and tilting device for the box I provide a hinged gate which may be readily unhooked and thrown open after the box has been tilted. As shown in Fig. 1, the gate or end-board 29 is hung on the cross-rod 30 and is normally held in place by the wide locking bar 31, which is hinged at its lower edge by several staples 32 and has the arm 33 running back along the side of the box and arranged to be held down by the swinging stop 34. When the stop is withdrawn the lever 33 is turned down by the pressure of the tail-board and the tail-board immediately pushed out by the pressure of the material in the box.

Having thus described my invention, I claim as new and desire to secure by Letters Patent—

1. The combination, in a dumping wagon, of the forward axle, with the rear axle, the reach connecting the same, the pivoted bolster arranged upon the forward axle, the short rearwardly extending slide frame 9 connected with said bolster and having its rear end depressed and engaging an intermediate part of the reach, the wagon body to rest upon said bolster upon the slide 9 and the rear axle, and means for sliding said body backward to dump the same, substantially as described.

2. The combination, in a dumping wagon, of the forward axle, with the rear axle, the reach connecting the same, the pivoted bolster arranged upon the forward axle, the short rearwardly extending slide frame 9 connected with said bolster and having its rear end depressed and engaging an intermediate part of the reach, the wagon body to rest upon said bolster upon the slide 9 and the rear axle, the shaft arranged in proximity to the rear axle and having the gear wheels, the rack bars provided upon the under side of the wagon body, a crank for said shaft, and means for limiting the rearward movement of said body and also the tilting movement thereof, substantially as described.

In testimony whereof I have hereunto set my hand this 20th day of January, A. D. 1893.

SIMON P. SNYDER.

In presence of—
    IDA SHERRY,
    H. H. ANDREWS.